(No Model.) 3 Sheets—Sheet 2.

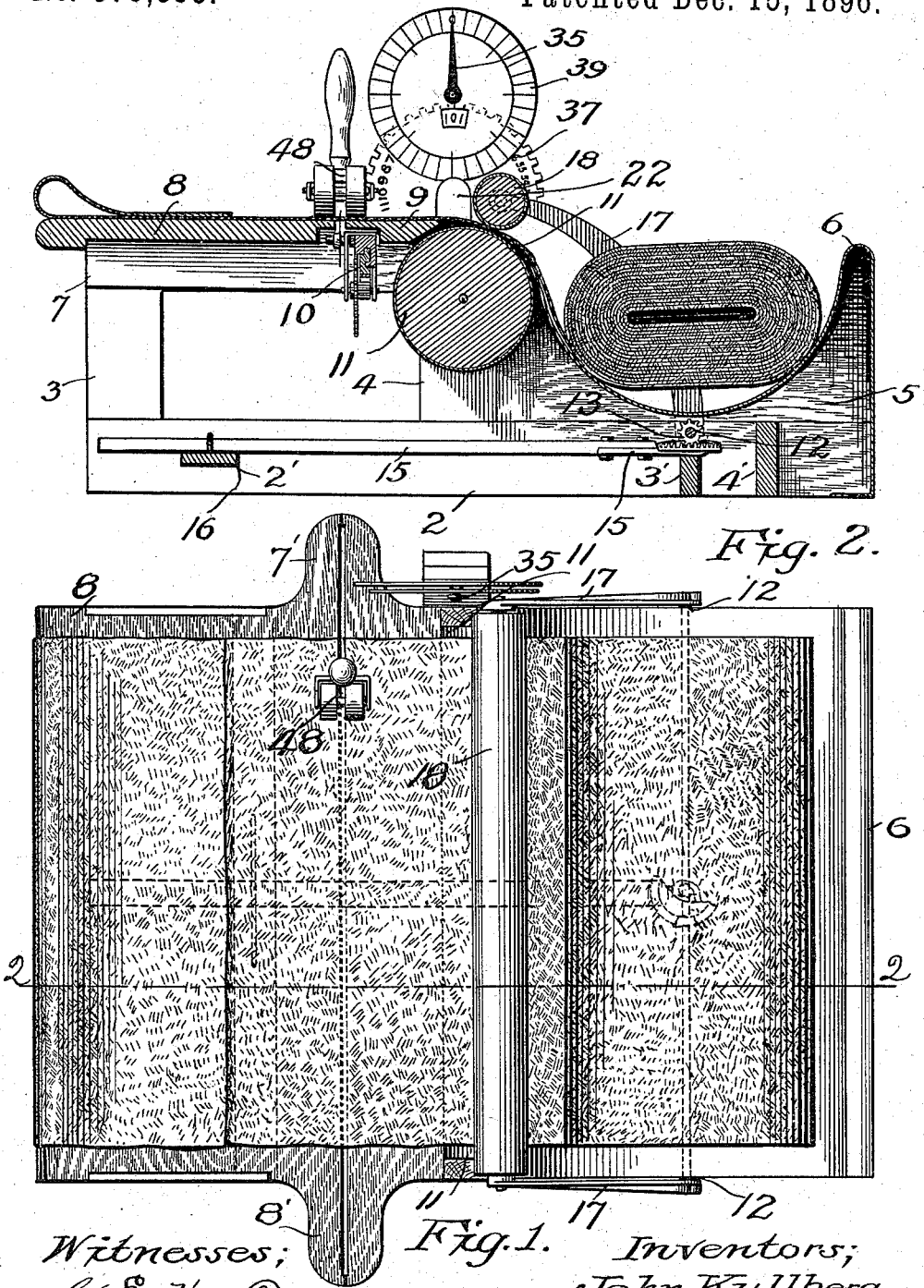

J. KULLBERG & C. BRUNZELL.
CLOTH MEASURING MACHINE.

No. 573,335. Patented Dec. 15, 1896.

Witnesses:
O. E. Van Horn
Richard Paul

Inventors:
John Kullberg
Charlie Brunzell,
By Paul O. Hawley
their Attorneys.

THE NORRIS PETERS CO., PHOTO-LITHO., WASHINGTON, D. C.

(No Model.) 3 Sheets—Sheet 3.
J. KULLBERG & C. BRUNZELL.
CLOTH MEASURING MACHINE.
No. 573,335. Patented Dec. 15, 1896.
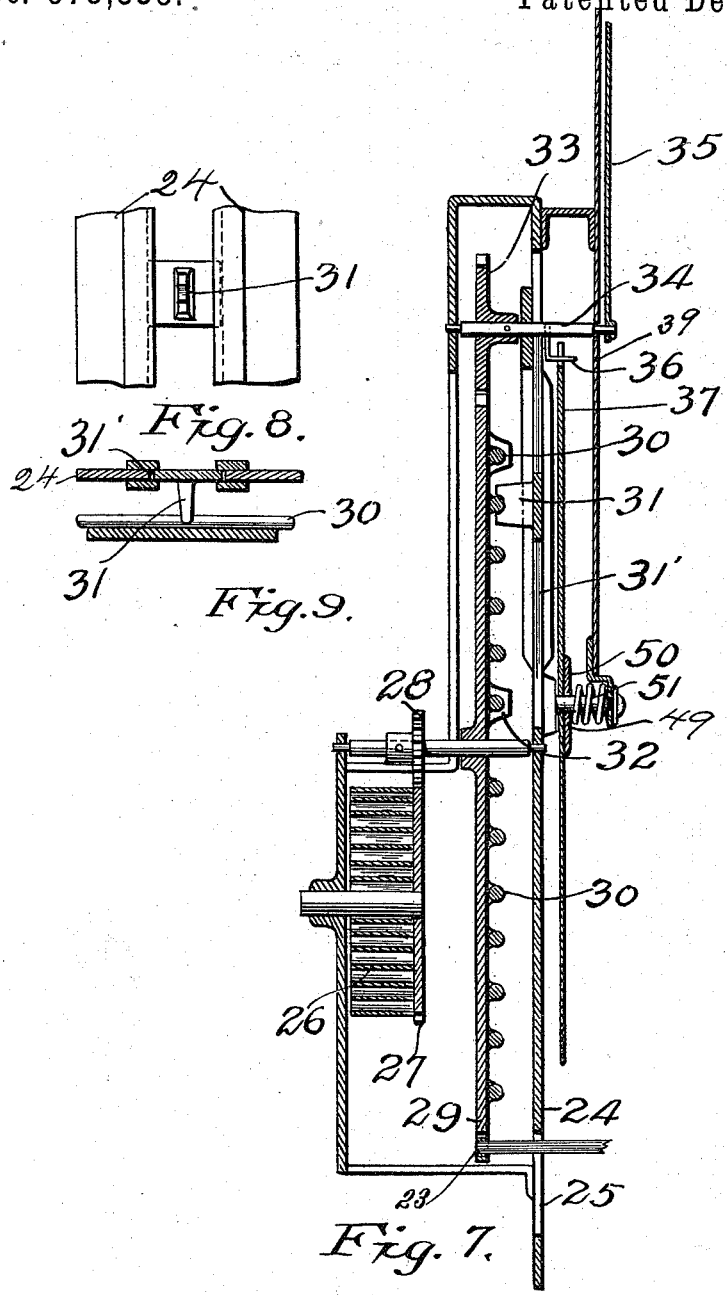
Witnesses:
O. E. Van Doren
Richard Paul
Inventors
John Kullberg
Charlie Brunzell
By Paul O. Hawley
their Attorneys.

UNITED STATES PATENT OFFICE.

JOHN KULLBERG AND CHARLIE BRUNZELL, OF MINNEAPOLIS, MINNESOTA; SAID KULLBERG ASSIGNOR TO CHARLES A. BRUNZELL, OF SAME PLACE.

CLOTH-MEASURING MACHINE.

SPECIFICATION forming part of Letters Patent No. 573,335, dated December 15, 1896.

Application filed March 1, 1895. Serial No. 540,131. (No model.)

*To all whom it may concern:*

Be it known that we, JOHN KULLBERG and CHARLIE BRUNZELL, of Minneapolis, Hennepin county, Minnesota, have invented certain new and useful Improvements in Cloth-Measuring Machines, of which the following is a specification.

Our invention relates to cloth-measuring machines; and the object we have in view is to provide a simple machine in which the bolt of cloth may be placed which it is desired to measure; and a further object is to provide a measuring and indicating machine for accurately measuring and recording the yards and fractions of yards of cloth as it is unrolled from the bolt; and a further object is to provide a knife or cutter of peculiar construction by means of which the cloth may be cut from the bolt at any time.

Our invention consists generally in constructions and combinations, as hereinafter described, and particularly pointed out in the claims.

The invention will be more readily understood by reference to the accompanying drawings, forming part of this specification, and in which—

Figure 3:
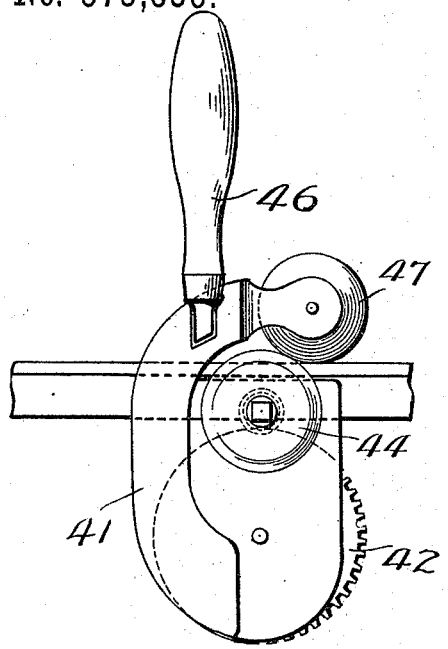
Figure 4:
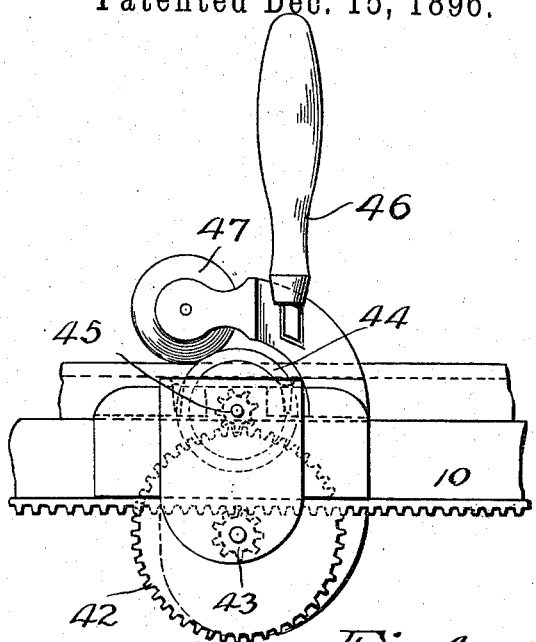
Figure 5:
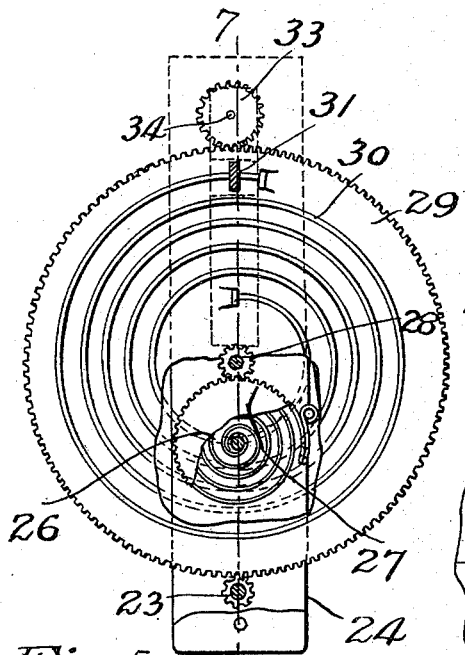
Figure 6:
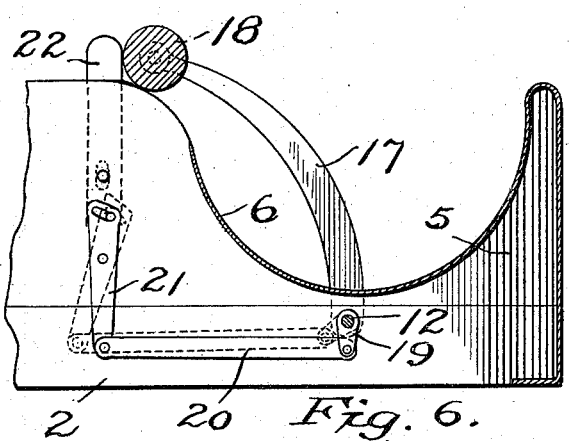

Figure 1 is a plan view of a cloth-measuring machine embodying our invention. Fig. 2 is a longitudinal section on the line 2 2 of Fig. 1. Fig. 3 is a side elevation of the cloth-cutting machine. Fig. 4 is a similar view of the opposite side of Fig. 3. Fig. 5 is a side elevation of the indicating mechanism. Fig. 6 is a sectional view of the frame of the machine, showing the mechanism for throwing the indicating device into engagement with the large roll. Fig. 7 is a vertical section on the line 7 7 of Fig. 5. Figs. 8 and 9 are details of the sliding lug carried by the frame of the recording mechanism.

In the drawings, 2 represents the sides of the frame of the machine at the bottom and having the upright standards 3 and 4 secured thereto, and the part 5 at one end hollowed out in the form of a semicircle to receive the bolt of cloth, as shown in Fig. 2, and provided with a smooth lining 6 of any suitable material, preferably metal, over which the bolt of cloth will turn easily. This hollowed-out or semicircular depression in the frame provided with a lining 6 forms a trough or receptacle in which the bolt of cloth is placed and in which it is held while the cloth is being unwound. This makes it unnecessary to provide a roller or shaft for the bolt of cloth to turn upon, as is usually done. The side pieces 2 are preferably connected at the bottom by suitable cross-bars 2', 3', and 4'.

Upon the top of the standards 3 and 4 are arranged the horizontal parts 7, forming the top of the frame of the machine. These side pieces or parts 7 are provided on their inner sides with suitable slats, which support the sliding top or plate 8, over which the cloth passes as it is drawn from between the rolls. The inner edge of the top 8 is rabbeted on its under surface, as shown in Fig. 2, and a part 9 is also provided having its ends supported by the parts 7, and also provided with a rabbeted edge adjacent to the part 8 and having its opposite edge beveled, as shown in Fig. 2. The parts 7 and 8 are provided on either side with extensions 7' and 8', for the purpose hereinafter described.

Beneath the rabbeted edge of the part 9 is arranged a bar 10, extending entirely across the machine and supported in slots provided in the inner side of the parts 7. The part 10 is provided with a rack upon its under side, for the purpose hereinafter described.

Beneath the beveled edge of the part 9 and extending across the machine and having its ends supported in the standards 4 is a large roller 11, and extending across the machine beneath the part 5 and supported at either end in the part 2 of the frame is a rock-shaft 12, having a pinion 13 near the central portion in position to engage a bevel-gear carried upon the inner end of the horizontal lever 15, which extends along the lower part of the frame parallel to the side pieces 2. A guide 16 is provided on the cross-bar 2' and limits the movement of the bar 15 in either direction. When the lever is moved back and forth in the guide 16, the shaft 12 will be rocked in its bearings.

Arranged upon either end of the shaft 12 outside of the frame of the machine are the curved arms 17, carrying the small roller 18 in bearings at their outer end. As shown in Fig. 2, when the machine is in use the roller 18 rests upon the roller 11 and serves to keep the cloth straight and prevents it from getting wrinkled as it passes through the machine. The arms 17 may be thrown back and the roller moved away from the roller 11 by the movement of the lever 15.

At one side of the machine, just inside one of the side pieces 2, is a short link 19, Fig. 6, having one end secured to the rock-shaft 12 and the other end pivoted to a long horizontal link 20, as shown in Fig. 6. The opposite end of the link 20 is pivoted to an upright link 21, having its upper end pivotally secured to a vertically-moving slat 22, which is arranged in a slot in the outside of one of the upright standards 4. This slat 22 carries the measuring and indicating mechanism hereinafter described, and when the arms 17 and the roll 18 are thrown forward toward the roller 11 the gear on the indicating mechanism is thrown into engagement with a pinion 23 upon the outer end of the shaft carrying the large roller 11 and is disengaged therefrom when the lever 15 is thrown in the opposite direction and the arms 17 are thrown back away from the roller 11.

The indicating mechanism comprises a suitable frame 24, made, preferably, of metal and having an opening 25, through which the pinion 23, carried by the axis of the roller 11, extends to engage the gear-wheel 29. The frame 24 is secured to the vertically-moving part 22 by screws or in any other suitable way. The large gear 29 is mounted in bearings in the frame 24 and is connected with a spiral spring 26, carried by said frame through the gear 27 and the pinion 28.

The gear 29 is provided upon its inner face with a spiral rib 30, preferably of wire, secured at intervals along the face of the wheel in any suitable manner. The coils of wire are arranged with intervals between them, and the inner end of the wire is secured to the surface of the wheel at a point near its axis, while the outer end is secured at a point near its periphery. A lug 31 is arranged to slide in a slot 31' in the frame 24 and is provided with a grooved outer end to engage the coils of the wire 30, which slide along therein as the wheel 29 is revolved and acts as a speed-regulator or brake to regulate the reverse or return movement of the gear 29 and the parts connected therewith. A stop 32 is provided at the inner end of the coil 30, which prevents the lug 31 from being disengaged therefrom and limits the travel of the wheel in this direction. Above the wheel 29 and also mounted in bearings in the frame 24 is a small gear-wheel 33 in position to engage the teeth upon the wheel 29. The shaft 34 of this gear is extended and forms a stud to carry the indicating-hand or pointer 35. This shaft 34 is also provided with a lug or extension 36 to engage the teeth of the indicating-dial 37 at each revolution of the wheel 33.

When the cloth is drawn over the roller 11, the pinion 23 being in engagement with the teeth of the wheel 29, the indicating mechanism will be put in operation and the coil-spring 26 put under tension as the gear-wheel 29 is revolved, and the revolution of the wheel will continue in one direction until the stud strikes the stop arranged near the inner end of the coil 30, thereby preventing the further revolution of the wheel in that direction. The roller 11 and the pinion 23 are preferably made of such size that they make two revolutions for each yard of cloth that is passed over the roll, and as the gear-wheel 33 is double the size of the pinion 23 it therefore follows that the wheel 33 and the hand 35, carried by the shaft thereof, will make one complete revolution for each yard of cloth that is passed between the rolls.

The indicating-dial 37 has numerals marked upon its face, representing yards, starting from a given point upon the face of the wheel, and as the shaft 34 is revolved the lug 36 carried thereby will be brought into engagement with the teeth of the indicating-wheel at each revolution of the wheel 33. This movement will move the indicating-wheel forward one notch, each notch representing a yard. A dial 39 is carried by the shaft 34 and is provided with an opening in its face, through which may be seen the figures upon the face of the recording-dial 37. This dial 39 is suitably spaced to represent fractions of a yard.

We provide a knife or cutter arranged to travel in a slot between the parts 8 and 9, forming the top of the machine. By means of this knife or cutter the cloth may be cut whenever desired. It consists of the frame or part 41, carrying at its lower end the gear 42, mounted in bearings in the frame, and the pinion 43 on the axis of said gear 42 and in position to engage the teeth on the under side of the rack-bar 10, heretofore described.

The cutter or knife 44 is mounted in bearings in the upper part of the frame 41, and consists of a disk having a sharp cutting edge and carrying on its axis a pinion 45 to engage the teeth of the gear 42. The frame 41 is also provided with an upright handle 46 and with a roller 47, provided with an annular groove 48 near its central portion in position to pass over the slot in the top of the machine. The ends of the roller bear upon the cloth while it is being cut and serve to hold it securely. By means of the gearing between the disk and the rack-bar the disk is revolved very rapidly, while the pinion 43 passes slowly over the rack-bar 10 and will cut its way through cloth of almost any thickness that may be passed through the rolls. When the cutter is not in use, it may be pushed out into the extension provided upon either side of the top of the machine, as shown in Fig. 1. The stud 49, carrying the recording-dial 37. is provided with a loose disk 50 to bear upon the surface of the dial, and a coil-spring 51 is arranged on the stud between the disk 50 and the outer end of the stud, by means of which the disk is held in engagement with the surface of the indicating-dial and the same held from turning, except when engaged by the lug 36.

While we have shown the frame of the machine as constructed of wood, we prefer to make it of metal, as many of the parts may be cast with very little expense.

The operation of our machine is as follows: A bolt of cloth is placed in the machine and the end of the cloth drawn over the roll 11. By throwing the lever 15 the upper roll 18 is thrown forward to press upon the upper surface of the cloth, and by the same operation the indicating mechanism is thrown into engagement with the pinion on the shaft of the large roll 11. As the cloth is drawn through the rolls the large gear 29 will be slowly revolved, putting the spring 26 under tension and causing the sliding lug 31 to move over the curved guide 30 until it strikes the lug 32 near the center of the gear 29. The motion of the machine is then arrested. When the lever 15 is thrown in the opposite direction and the indicating mechanism disengaged from the pinion on the shaft of the roll 11, the spring 26 will reverse the movement of the gear 29 and carry the lug 31 back to its normal position, when the former operation may be repeated until the cloth in the bolt is measured.

Having thus described our invention, we claim as new and desire to secure by Letters Patent—

1. A cloth-measuring machine, comprising, in combination, a suitable frame, a measuring-roller mounted in bearings therein, a rocking shaft also mounted in said frame, means for rocking the same, arms carried by said shaft, a roller mounted in bearings upon said arms and arranged to bear upon the surface of said first-named roller, an indicating mechanism and means connecting said indicating mechanism with said rocking shaft, whereby as said shaft is rocked said indicating mechanism will be thrown into or out of engagement with said first-named roller.

2. A cloth-measuring machine, comprising, in combination, a suitable frame, a measuring-roller carried thereby having a gear upon its axis, a rock-shaft also carried by said frame and provided with suitable arms, a small roller mounted in bearings in said arms and arranged to be brought into contact or moved away from said measuring-roller when said shaft is rocked, an indicating mechanism, and means connecting said rocking shaft with said indicating mechanism, whereby when said shaft is rocked said indicating mechanism will be thrown into or out of engagement with the gear of the measuring-roller.

3. A cloth-measuring machine, comprising, in combination, a suitable frame, a measuring-roller mounted therein and provided with a gear upon its axis, a rock-shaft also carried by said frame and provided with arms, a roller mounted in bearings in said arms, a pinion upon said rock-shaft, a lever provided with a bevel-gear to engage said pinion, whereby as said lever is moved to and fro said shaft will be rocked, a vertically-movable indicating mechanism carried by said frame in position to be operated by the movement of said measuring-roller, and means connecting said rocking shaft and said indicating mechanism, whereby as said lever is operated said indicating mechanism will be thrown into or out of engagement with the gear carried by the measuring-roller, for the purpose set forth.

4. The combination, in a cloth-measuring machine, of a frame, a measuring-roller mounted in bearings therein and provided with a gear upon its axis, an indicating mechanism also carried by said frame, said indicating mechanism comprising a suitable frame, a large gear mounted therein, a spring for reversing said gear, an indicating-dial carried by said frame, a small gear engaging said large gear, means carried by the shaft of said small gear for operating said indicating-dial, and means for throwing said large gear into or out of engagement with the gear upon the axis of said measuring-roller.

5. The combination, in a cloth-measuring machine, of a measuring-roller mounted in a suitable frame, a gear carried by the axis of said roller, an indicating mechanism carried by the frame of said machine, said mechanism consisting of a suitable frame, a gear 29 mounted in said frame, a spring for reversely actuating said gear 29, a spiral guide upon the face of said gear, a movable lug carried by said frame and arranged to engage said guide, stops upon said guide whereby the travel of said gear 29 is limited, a gear 33 also mounted in said frame and arranged to engage the teeth of said gear 29, an indicating-wheel in position to be operated from the shaft of said gear 33, and means for throwing said gear 29 into engagement with the gear upon the axis of said measuring-roller.

6. The combination, in a cloth-measuring machine, of a measuring-roller mounted therein, an indicating mechanism comprising a suitable frame 24, the gear 29, a spring for reversing said gear 29, means for limiting the travel of said gear in either direction, the indicating-dial carried by said frame, a gear 33 also carried by said frame and arranged to engage the teeth of said gear 29, the shaft of said gear 33 being provided with the lug to engage the teeth of said indicating-dial, the second dial, a hand or pointer carried by the shaft of said gear 33, and means for operating said indicating mechanism when said roller is revolved, whereby the cloth passing over the said roller will be accurately measured and indicated.

7. A cloth-measuring machine, comprising, in combination, a suitable frame, a measuring-roller mounted therein, an indicating mechanism consisting of a frame 24, the gear 29 carried by said frame, means for limiting the travel of said gear in either direction, a gear 33 also carried by said frame and provided with a lug for engaging the teeth of an indicating-dial 37, means for throwing said indicating mechanism into engagement with said measuring-roller, and a spring arranged within said frame 24 for returning said indicating mechanism to its normal position when disengaged from said roller.

In testimony whereof we have hereunto set our hands this 9th day of February, A. D. 1895.

JOHN KULLBERG.
CHARLIE BRUNZELL.

In presence of—
C. G. HAWLEY,
RICHARD PAUL.